United States Patent
Maeno et al.

(10) Patent No.: US 9,279,828 B2
(45) Date of Patent: *Mar. 8, 2016

(54) SAMPLE FIXING MEMBER FOR ATOMIC FORCE MICROSCOPE

(71) Applicant: NITTO DENKO CORPORATION, Ibaraki-shi, Osaka (JP)

(72) Inventors: Youhei Maeno, Ibaraki (JP); Yoshinori Suzuki, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/374,733

(22) PCT Filed: Jan. 29, 2013

(86) PCT No.: PCT/JP2013/051804
§ 371 (c)(1),
(2) Date: Jul. 25, 2014

(87) PCT Pub. No.: WO2013/115144
PCT Pub. Date: Aug. 8, 2013

(65) Prior Publication Data
US 2015/0013036 A1   Jan. 8, 2015

(30) Foreign Application Priority Data
Feb. 3, 2012   (JP) .................... 2012-021711

(51) Int. Cl.
*G01Q 30/20* (2010.01)
*C01B 31/02* (2006.01)
*G01Q 60/24* (2010.01)
*B82Y 15/00* (2011.01)

(52) U.S. Cl.
CPC ............ *G01Q 30/20* (2013.01); *C01B 31/0226* (2013.01); *G01Q 60/24* (2013.01); *B82Y 15/00* (2013.01); *C01B 2202/08* (2013.01); *Y10S 977/752* (2013.01)

(58) Field of Classification Search
CPC ........ G01Q 30/08; G01Q 30/18; G01Q 30/20
USPC ........................ 850/5, 12, 17, 18; 250/440.11
See application file for complete search history.

(56) References Cited

U.S. PATENT DOCUMENTS 8,025,971 B2 * 9/2011 Maeno et al. ................. 428/398
8,900,701 B2   12/2014 Maeno et al.
(Continued)

FOREIGN PATENT DOCUMENTS

CN   102007071 A   4/2011
JP   2009-133721 A   6/2009
(Continued)

OTHER PUBLICATIONS

International Search Report for PCT/JP2013/051804 dated Mar. 26, 2013 [PCT/ISA/210] English.
(Continued)

*Primary Examiner* — Nicole Ippolito
(74) *Attorney, Agent, or Firm* — Sughrue Mion, PLLC

(57) ABSTRACT

Provided is a sample fixing member for an atomic force microscope capable of reducing the drift amount of a sample during measurement. A sample fixing member for an atomic force microscope of the present invention includes a fibrous columnar structure including a plurality of fibrous columnar objects each having a length of 200 μm or more.

5 Claims, 2 Drawing Sheets

(56) References Cited

U.S. PATENT DOCUMENTS

| | | | |
|---|---|---|---|
| 2006/0062924 A1* | 3/2006 | Horiuchi | B82Y 15/00 427/430.1 |
| 2008/0308295 A1 | 12/2008 | Fu et al. | |
| 2009/0148573 A1* | 6/2009 | Kitamura et al. | 426/323 |
| 2011/0039095 A1* | 2/2011 | Maeno et al. | 428/332 |
| 2011/0189459 A1* | 8/2011 | Maeno et al. | 428/292.1 |
| 2012/0258275 A1* | 10/2012 | Maeno | 428/95 |
| 2013/0059110 A1* | 3/2013 | Maeno | 428/96 |
| 2014/0170368 A1* | 6/2014 | Maeno | 428/95 |

FOREIGN PATENT DOCUMENTS

| | | |
|---|---|---|
| JP | 2011-132074 A | 7/2011 |
| JP | 2011-132075 A | 7/2011 |
| JP | 2011-132387 A | 7/2011 |
| JP | 2011-252849 A | 12/2011 |
| WO | 2011/077785 A1 | 6/2011 |

OTHER PUBLICATIONS

Notification of First Office Action mailed May 27, 2015, issued by the State Intellectual Property Office of the People's Republic of China in counterpart Application No. 201380007659.3.

Extended European Search Report dated Dec. 2, 2015 from the European Patent Office in counterpart application No. 13742917.1.

Decision of Refusal dated Jan. 6, 2016 from the Japanese Patent Office in counterpart application No. 2012-021711.

* cited by examiner

SAMPLE FIXING MEMBER FOR ATOMIC FORCE MICROSCOPE

CROSS REFERENCE TO RELATED APPLICATIONS

This application is a National Stage of International Application No. PCT/JP2013/051804, filed on Jan. 29, 2013, which claims priority from Japanese Patent Application No. 2012-021711, filed on Feb. 3, 2012, the contents of all of which are incorporated herein by reference in their entirety.

TECHNICAL FIELD

The present invention relates to a sample fixing member for an atomic force microscope, and more specifically, to a member for fixing a sample to be measured in an atomic force microscope (AFM).

BACKGROUND ART

An atomic force microscope (AFM) is a microscope having a resolution at an atomic level under atmospheric pressure, and can easily observe, for example, the fine shape of the surface of a sample (see, for example, Patent Literature 1). In addition, the atomic force microscope can observe not only a conductive material but also an insulating material such as a polymer compound. In those respects, the atomic force microscope is extremely effective as means for observing the surfaces of various samples.

The atomic force microscope observes the shape of the surface of a sample by: scanning the top of the surface with a probe having a tapered tip; and transforming an atomic force felt by the probe into an electric signal. The probe is attached to the tip of a cantilever, and the probe and the surface of the sample are brought into contact with each other by a minute force. Accordingly, when the drift amount of the sample during measurement is large, the following problem arises. An accurate measurement result cannot be obtained.

CITATION LIST

Patent Literature

[PTL 1] JP 2011-252849 A

SUMMARY OF INVENTION

Technical Problem

An object of the present invention is to provide a sample fixing member for an atomic force microscope capable of effectively reducing the drift amount of a sample during measurement.

Solution to Problem

According to one embodiment of the present invention, there is provided a sample fixing member for an atomic force microscope, including a fibrous columnar structure including a plurality of fibrous columnar objects each having a length of 200 μm or more.

In a preferred embodiment, the sample fixing member for an atomic force microscope of the present invention has a shearing adhesive strength for a glass surface at room temperature of 10 N/cm² or more.

In a preferred embodiment, the fibrous columnar structure includes a carbon nanotube aggregate including a plurality of carbon nanotubes.

In a preferred embodiment, the carbon nanotubes each have a plurality of walls; a distribution width of a wall number distribution of the carbon nanotubes is 10 walls or more; and a relative frequency of a mode of the wall number distribution is 25% or less.

In a preferred embodiment, the carbon nanotubes each have a plurality of walls; a mode of a wall number distribution of the carbon nanotubes is present at a wall number of 10 or less; and a relative frequency of the mode is 30% or more.

In a preferred embodiment, the sample fixing member for an atomic force microscope of the present invention includes a base material.

Advantageous Effects of Invention

According to one embodiment of the present invention, the sample fixing member for an atomic force microscope capable of effectively reducing the drift amount of a sample during measurement can be provided.

DESCRIPTION OF EMBODIMENTS

<<Sample Fixing Member for Atomic Force Microscope>>

A sample fixing member for an atomic force microscope of the present invention includes a fibrous columnar structure including a plurality of fibrous columnar objects each having a length of 200 μm or more. When the sample fixing member for an atomic force microscope of the present invention includes the fibrous columnar structure including the plurality of fibrous columnar objects each having a length of 200 μm or more, the drift amount of a sample during measurement can be effectively reduced. The sample fixing member for an atomic force microscope of the present invention may be a member formed only of the fibrous columnar structure, or may be a member formed of the fibrous columnar structure and any appropriate material that can be preferably used in the fixing of a sample for an atomic force microscope.

The sample fixing member for an atomic force microscope of the present invention is a member for bonding and fixing a measurement sample in an atomic force microscope, and its size and shape can be appropriately selected depending on the kind of the atomic force microscope to be used.

Figure 1:
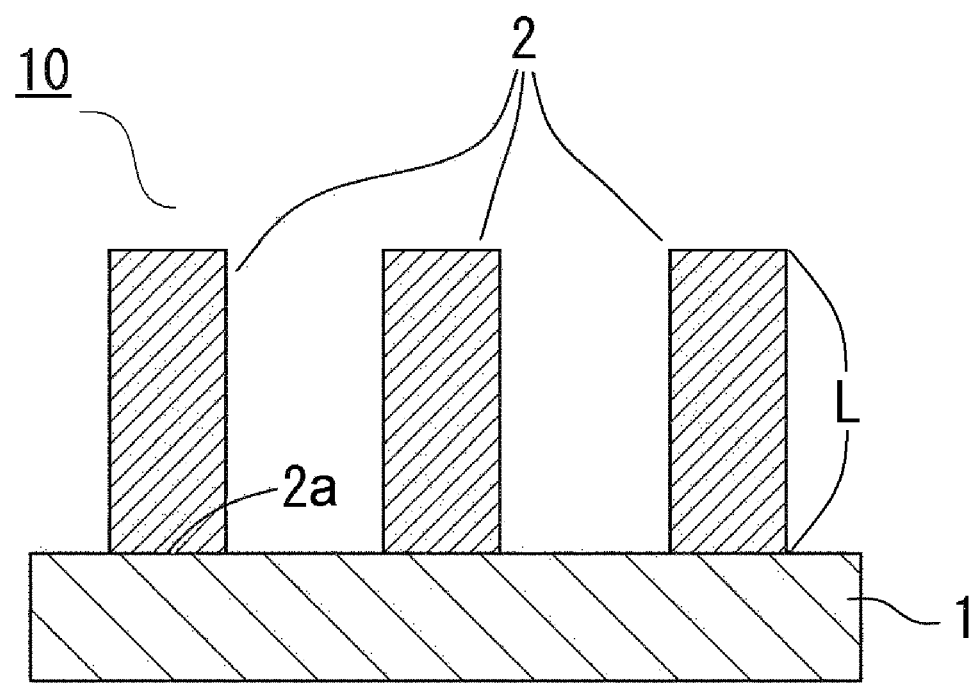
FIG. 1 is a schematic sectional view of an example of a sample fixing member for an atomic force microscope in a preferred embodiment of the present invention.

The fibrous columnar structure is an aggregate including a plurality of fibrous columnar objects. The fibrous columnar structure is preferably an aggregate including a plurality of fibrous columnar objects each having a length L. FIG. 1 illustrates a schematic sectional view of an example of a sample fixing member for an atomic force microscope in a preferred embodiment of the present invention.

In FIG. 1, a fibrous columnar structure 10 includes a base material 1 and a plurality of fibrous columnar objects 2. One end 2a of each of the fibrous columnar objects 2 is fixed to the base material 1. The fibrous columnar objects 2 are each aligned in the direction of the length L. The fibrous columnar objects 2 are each preferably aligned in a direction substantially perpendicular to the base material 1. The term "direction substantially perpendicular" as used herein means that the angle of the object with respect to the surface of the base material 1 is preferably 90°±20°, more preferably 90°±15°, still more preferably 90°±10°, particularly preferably 90°±5°. It should be noted that unlike the illustrated example, the fibrous columnar structure 10 may be an aggregate formed only of the plurality of fibrous columnar objects 2. That is, the fibrous columnar structure 10 may not include the base material 1. In this case, the plurality of fibrous columnar objects 2 can exist together as an aggregate by virtue of, for example, a van der Waals force.

The length L is 200 μm or more, preferably from 200 μm to 2,000 μm, more preferably from 300 μm to 1,500 μm, still more preferably from 400 μm to 1,000 μm, particularly preferably from 500 μm to 1,000 μm, most preferably from 600 μm to 1,000 μm. When the length L falls within the range, the sample fixing member for an atomic force microscope of the present invention can effectively reduce the drift amount of the sample during the measurement. It should be noted that the length L is measured by a method to be described later.

The sample fixing member for an atomic force microscope of the present invention has a shearing adhesive strength for a glass surface at room temperature of preferably 10 N/cm$^2$ or more, more preferably from 10 N/cm$^2$ to 200 N/cm$^2$, still more preferably from 15 N/cm$^2$ to 200 N/cm$^2$, particularly preferably from 20 N/cm$^2$ to 200 N/cm$^2$, most preferably from 25 N/cm$^2$ to 200 N/cm$^2$. When the shearing adhesive strength falls within the range, the sample fixing member for an atomic force microscope of the present invention can reduce the drift amount of the sample during the measurement in an additionally effective manner. It should be noted that the shearing adhesive strength is measured by a method to be described later.

Any appropriate material may be adopted as a material for the fibrous columnar object. Examples thereof include: metals such as aluminum and iron; inorganic materials such as silicon; carbon materials such as a carbon nanofiber and a carbon nanotube; and high-modulus resins such as an engineering plastic and a super engineering plastic. Specific examples of the resin include polystyrene, polyethylene, polypropylene, polyethylene terephthalate, acetyl cellulose, polycarbonate, polyimide, and polyamide. Any appropriate physical property may be adopted as each physical property of the resin such as the molecular weight thereof as long as the object of the present invention can be attained.

Any appropriate base material may be adopted as the base material depending on purposes. Examples thereof include quartz glass, silicon (such as a silicon wafer), an engineering plastic, and a super engineering plastic. Specific examples of the engineering plastic and the super engineering plastic include polyimide, polyethylene, polyethylene terephthalate, acetyl cellulose, polycarbonate, polypropylene, and polyamide. Any appropriate physical property may be adopted as each physical property of the base material such as the molecular weight thereof as long as the object of the present invention can be attained.

The diameter of the fibrous columnar object is preferably from 0.3 nm to 2,000 nm, more preferably from 1 nm to 1,000 nm, still more preferably from 2 nm to 500 nm. When the diameter of each of the fibrous columnar objects falls within the range, the sample fixing member for an atomic force microscope of the present invention can reduce the drift amount of the sample during the measurement in an additionally effective manner.

The thickness of the base material may be set to any appropriate value depending on purposes.

The surface of the base material may be subjected to conventional surface treatment, e.g., chemical or physical treatment such as chromic acid treatment, exposure to ozone, exposure to a flame, exposure to a high-voltage electric shock, or ionizing radiation treatment, or coating treatment with an under coat (such as the above-mentioned adherent material) in order that adhesiveness with an adjacent layer, retentivity, or the like may be improved.

The base material may be a single layer, or may be a multilayer body.

In the present invention, the fibrous columnar structure is preferably a carbon nanotube aggregate including a plurality of carbon nanotubes. In this case, the fibrous columnar structure is preferably a carbon nanotube.

The sample fixing member for an atomic force microscope of the present invention may be formed of only a carbon nanotube aggregate or may be formed of a carbon nanotube aggregate and any appropriate member.

When the sample fixing member for an atomic force microscope of the present invention includes a carbon nanotube aggregate including a plurality of carbon nanotubes and also includes the base material, one end of each of the carbon nanotubes may be fixed to the base material.

When the sample fixing member for an atomic force microscope of the present invention includes a carbon nanotube aggregate including a plurality of carbon nanotubes and includes a base material, any appropriate method may be adopted as a method of fixing the carbon nanotubes to the base material. For example, a substrate used in the production of the carbon nanotube aggregate may be directly used as a base material. Further, a base material having formed thereon an adhesion layer may be fixed to the carbon nanotubes. Further, when the base material is a thermosetting resin, the fixing may be performed by producing a thin film in a state before a reaction, and crimping one end of each of the carbon nanotubes to the thin film layer, followed by curing treatment. In addition, when the base material is a thermoplastic resin or a metal, the fixing may be performed by crimping one end of the fibrous columnar structure to the base material in a molten state, followed by cooling to room temperature.

<<Carbon Nanotube Aggregate>>

When the sample fixing member for an atomic force microscope of the present invention includes a fibrous columnar structure, the fibrous columnar structure is preferably a carbon nanotube aggregate. When the sample fixing member for an atomic force microscope of the present invention includes the carbon nanotube aggregate, the sample fixing member for an atomic force microscope of the present invention can reduce the drift amount of the sample during the measurement in an additionally effective manner.

<First Preferred Embodiment>

A preferred embodiment (hereinafter sometimes referred to as "first preferred embodiment") of the carbon nanotube aggregate that may be included in the sample fixing member for an atomic force microscope of the present invention includes a plurality of carbon nanotubes, in which: the carbon nanotubes each have a plurality of walls; the distribution width of the wall number distribution of the carbon nanotubes is 10 walls or more; and the relative frequency of the mode of the wall number distribution is 25% or less.

The distribution width of the wall number distribution of the carbon nanotubes is 10 walls or more, preferably from 10 walls to 30 walls, more preferably from 10 walls to 25 walls, still more preferably from 10 walls to 20 walls.

The "distribution width" of the wall number distribution of the carbon nanotubes refers to a difference between the maximum wall number and minimum wall number in the wall numbers of the carbon nanotubes. When the distribution width of the wall number distribution of the carbon nanotubes falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

The wall number and the wall number distribution of the carbon nanotubes may be measured with any appropriate device. The wall number and wall number distribution of the carbon nanotubes are preferably measured with a scanning electron microscope (SEM) or a transmission electron microscope (TEM). For example, at least 10, preferably 20 or more carbon nanotubes may be taken out from a carbon nanotube aggregate to evaluate the wall number and the wall number distribution by the measurement with the SEM or the TEM.

The maximum wall number of the carbon nanotubes is preferably from 5 to 30, more preferably from 10 to 30, still more preferably from 15 to 30, particularly preferably from 15 to 25.

The minimum wall number of the carbon nanotubes is preferably from 1 to 10, more preferably from 1 to 5.

When the maximum wall number and minimum wall number of the carbon nanotubes fall within the above-mentioned ranges, the carbon nanotubes can bring together additionally excellent mechanical properties and a high specific surface area, and moreover, the carbon nanotubes can provide a carbon nanotube aggregate exhibiting additionally excellent pressure-sensitive adhesive property. Therefore, the sample fixing member for an atomic force microscope using such carbon nanotube aggregate can reduce the drift amount of the sample during the measurement in an extremely effective manner.

The relative frequency of the mode of the wall number distribution is 25% or less, preferably from 1% to 25%, more preferably from 5% to 25%, still more preferably from 10% to 25%, particularly preferably from 15% to 25%. When the relative frequency of the mode of the wall number distribution falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

The mode of the wall number distribution is present at a wall number of preferably from 2 to 10, more preferably from 3 to 10. When the mode of the wall number distribution falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

Regarding the shape of each of the carbon nanotubes, the lateral section of the carbon nanotube has only to have any appropriate shape. The lateral section is of, for example, a substantially circular shape, an oval shape, or an n-gonal shape (n represents an integer of 3 or more).

The carbon nanotubes each have a length of preferably 200 µm or more, more preferably from 200 µm to 2,000 µm, still more preferably from 300 µm to 1,500 µm, even more preferably from 400 µm to 1,000 µm, particularly preferably from 500 µm to 1,000 µm, most preferably from 600 µm to 1,000 µm. When the length of each of the carbon nanotubes falls within the range, the sample fixing member for an atomic force microscope of the present invention can reduce the drift amount of the sample during the measurement in an additionally effective manner.

The diameter of each of the carbon nanotubes is preferably from 0.3 nm to 2,000 nm, more preferably from 1 nm to 1,000 nm, still more preferably from 2 nm to 500 nm. When the diameter of each of the carbon nanotubes falls within the range, the sample fixing member for an atomic force microscope of the present invention can reduce the drift amount of the sample during the measurement in an additionally effective manner.

The specific surface area and density of each of the carbon nanotubes may be set to any appropriate values.

<Second Preferred Embodiment>

Another preferred embodiment (hereinafter sometimes referred to as "second preferred embodiment") of the carbon nanotube aggregate that may be included in the sample fixing member for an atomic force microscope of the present invention includes a plurality of carbon nanotubes, in which: the carbon nanotubes each have a plurality of walls; the mode of the wall number distribution of the carbon nanotubes is present at a wall number of 10 or less; and the relative frequency of the mode is 30% or more.

The distribution width of the wall number distribution of the carbon nanotubes is preferably 9 walls or less, more preferably from 1 walls to 9 walls, still more preferably from 2 walls to 8 walls, particularly preferably from 3 walls to 8 walls.

The "distribution width" of the wall number distribution of the carbon nanotubes refers to a difference between the maximum wall number and minimum wall number of the wall numbers of the carbon nanotubes. When the distribution width of the wall number distribution of the carbon nanotubes falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

The wall number and wall number distribution of the carbon nanotubes may be measured with any appropriate device. The wall number and wall number distribution of the carbon nanotubes are preferably measured with a scanning electron microscope (SEM) or a transmission electron microscope (TEM). For example, at least 10, preferably 20 or more carbon nanotubes may be taken out from a carbon nanotube aggregate to evaluate the wall number and the wall number distribution by the measurement with the SEM or the TEM.

The maximum wall number of the carbon nanotubes is preferably from 1 to 20, more preferably from 2 to 15, still more preferably from 3 to 10.

The minimum wall number of the carbon nanotubes is preferably from 1 to 10, more preferably from 1 to 5.

When the maximum wall number and minimum wall number of the carbon nanotubes fall within the above-mentioned ranges, the carbon nanotubes can each bring together additionally excellent mechanical properties and a high specific surface area, and moreover, the carbon nanotubes can provide a carbon nanotube aggregate exhibiting additionally excellent pressure-sensitive adhesive property. Therefore, the sample fixing member for an atomic force microscope using such carbon nanotube aggregate can reduce the drift amount of the sample during the measurement in an extremely effective manner.

The relative frequency of the mode of the wall number distribution is 30% or more, preferably from 30% to 100%, more preferably from 30% to 90%, still more preferably from 30% to 80%, particularly preferably from 30% to 70%. When the relative frequency of the mode of the wall number distribution falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

The mode of the wall number distribution is present at a wall number of 10 or less, preferably from 1 to 10, more preferably from 2 to 8, still more preferably from 2 to 6. In the present invention, when the mode of the wall number distribution falls within the above-mentioned range, the carbon nanotubes can bring together excellent mechanical properties and a high specific surface area, and moreover, the carbon nanotubes can provide a carbon nanotube aggregate exhibiting excellent pressure-sensitive adhesive property. Therefore, the sample fixing member for an atomic force microscope using such carbon nanotube aggregate can reduce the drift amount of the sample during the measurement in an extremely effective manner.

Regarding the shape of each of the carbon nanotubes, the lateral section of the carbon nanotube has only to have any appropriate shape. The lateral section is of, for example, a substantially circular shape, an oval shape, or an n-gonal shape (n represents an integer of 3 or more).

The carbon nanotubes each have a length of preferably 200 μm or more, more preferably from 200 μm to 2,000 μm, still more preferably from 300 μm to 1,500 μm, even more preferably from 400 μm to 1,000 μm, particularly preferably from 500 μm to 1,000 μm, most preferably from 600 μm 1,000 μm. When the length of each of the carbon nanotubes falls within the range, the sample fixing member for an atomic force microscope of the present invention can reduce the drift amount of the sample during the measurement in an additionally effective manner.

The diameter of each of the carbon nanotubes is preferably from 0.3 nm to 2,000 nm, more preferably from 1 nm to 1,000 nm, still more preferably from 2 nm to 500 nm. When the diameter of each of the carbon nanotubes falls within the range, the sample fixing member for an atomic force microscope of the present invention can reduce the drift amount of the sample during the measurement in an additionally effective manner.

The specific surface area and density of each of the carbon nanotubes may be set to any appropriate values.

<<Method of Producing Carbon Nanotube Aggregate>>

Any appropriate method may be adopted as a method of producing the carbon nanotube aggregate that may be included in the sample fixing member for an atomic force microscope of the present invention.

The method of producing the carbon nanotube aggregate that may be included in the sample fixing member for an atomic force microscope of the present invention is, for example, a method of producing a carbon nanotube aggregate aligned substantially perpendicularly from a smooth substrate by chemical vapor deposition (CVD) involving forming a catalyst layer on the substrate and filling a carbon source in a state in which a catalyst is activated with heat, plasma, or the like to grow the carbon nanotubes. In this case, for example, the removal of the substrate provides a carbon nanotube aggregate aligned in a lengthwise direction.

Any appropriate substrate may be adopted as the substrate. The substrate is, for example, a material having smoothness and high-temperature heat resistance enough to resist the production of the carbon nanotubes. Examples of such material include quartz glass, silicon (such as a silicon wafer), and a metal plate made of, for example, aluminum. The substrate may be directly used as the substrate that may be included in the carbon nanotube aggregate that may be included in the sample fixing member for an atomic force microscope of the present invention.

Figure 2:
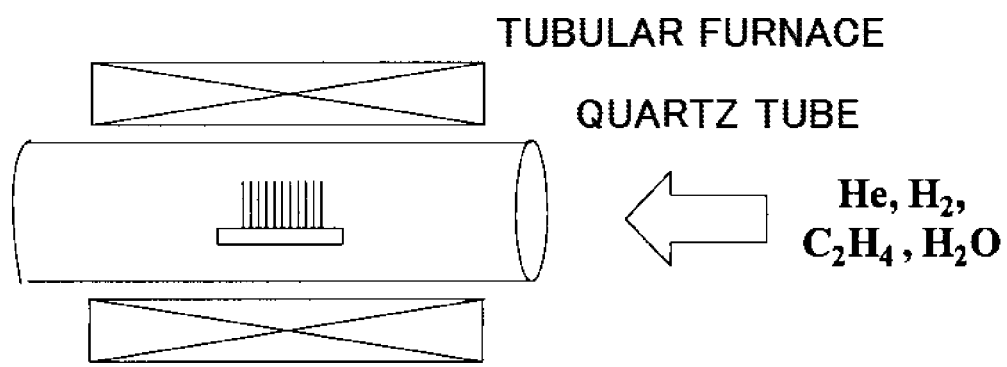
FIG. 2 is a schematic sectional view of an apparatus for producing a carbon nanotube aggregate when the sample fixing member for an atomic force microscope in the preferred embodiment of the present invention includes the carbon nanotube aggregate.

Any appropriate apparatus may be adopted as an apparatus for producing the carbon nanotube aggregate that may be included in the sample fixing member for an atomic force microscope of the present invention. The apparatus is, for example, a thermal CVD apparatus of a hot wall type formed by surrounding a cylindrical reaction vessel with a resistance heating electric tubular furnace as illustrated in FIG. 2. In this case, for example, a heat-resistant quartz tube is preferably used as the reaction vessel.

Any appropriate catalyst may be used as the catalyst (material for the catalyst layer) that may be used in the production of the carbon nanotube aggregate that may be included in the sample fixing member for an atomic force microscope of the present invention. Examples of the catalyst include metal catalysts such as iron, cobalt, nickel, gold, platinum, silver, and copper.

Upon production of the carbon nanotube aggregate that may be included in the sample fixing member for an atomic force microscope of the present invention, an alumina/hydrophilic film may be formed between the substrate and the catalyst layer as required.

Any appropriate method may be adopted as a method of producing the alumina/hydrophilic film. For example, the film may be obtained by producing an $SiO_2$ film on the substrate, depositing Al from the vapor, and increasing the temperature of Al to 450° C. after the deposition to oxidize Al. According to such production method, $Al_2O_3$ interacts with the hydrophilic $SiO_2$ film, and hence an $Al_2O_3$ surface different from that obtained by directly depositing $Al_2O_3$ from the vapor in particle diameter is formed. When Al is deposited from the vapor, and then its temperature is increased to 450° C. so that Al may be oxidized without the production of any hydrophilic film on the substrate, it may be difficult to form the $Al_2O_3$ surface having a different particle diameter. In addition, when the hydrophilic film is produced on the substrate and $Al_2O_3$ is directly deposited from the vapor, it may also be difficult to form the $Al_2O_3$ surface having a different particle diameter.

The catalyst layer that may be used in the production of the carbon nanotube aggregate that may be included in the sample fixing member for an atomic force microscope of the present invention has a thickness of preferably from 0.01 nm to 20 nm, more preferably from 0.1 nm to 10 nm in order that fine particles may be formed. When the thickness of the catalyst layer that may be used in the production of the carbon nanotube aggregate that may be included in the sample fixing member for an atomic force microscope of the present invention falls within the above-mentioned range, the carbon nanotube aggregate can bring together excellent mechanical properties and a high specific surface area, and moreover, the carbon nanotube aggregate can exhibit excellent pressure-sensitive adhesive property. Therefore, the sample fixing member for an atomic force microscope using such carbon nanotube aggregate can reduce the drift amount of the sample during the measurement in an extremely effective manner.

Any appropriate method may be adopted as a method of forming the catalyst layer. Examples of the method include a method involving depositing a metal catalyst from the vapor, for example, with an electron beam (EB) or by sputtering and a method involving applying a suspension of metal catalyst fine particles onto the substrate.

Any appropriate carbon source may be used as the carbon source that may be used in the production of the carbon nanotube aggregate that may be included in the sample fixing member for an atomic force microscope of the present invention. Examples thereof include: hydrocarbons such as methane, ethylene, acetylene, and benzene; and alcohols such as methanol and ethanol.

Any appropriate temperature may be adopted as a production temperature in the production of the carbon nanotube aggregate that may be included in the sample fixing member for an atomic force microscope of the present invention. For example, the temperature is preferably from 400° C. to 1,000° C., more preferably from 500° C. to 900° C., still more preferably from 600° C. to 800° C. in order that catalyst particles allowing sufficient expression of the effects of the present invention may be formed.

EXAMPLES

Hereinafter, the present invention is described by way of Examples. However, the present invention is not limited thereto. It should be noted that various evaluations and measurements were performed by the following methods.
<Measurement of Length L of Fibrous Columnar Object>
The length L of a fibrous columnar object was measured with a scanning electron microscope (SEM).
<Measurement of Shearing Adhesive Strength of Sample Fixing Member for Atomic Force Microscope>
A sample fixing member for an atomic force microscope cut into a unit area of 1 cm$^2$ was mounted on a glass (MATSUNAMI SLIDE GLASS measuring 27 mm by 56 mm) so that its tip (when the sample fixing member for an atomic force microscope included a carbon nanotube aggregate, the tip of a carbon nanotube) was in contact with the glass, and a 5-kg roller was reciprocated once to crimp the tip of the sample fixing member for an atomic force microscope onto the glass. After that, the resultant was left to stand for 30 minutes. A shearing test was performed with a tensile tester (Instron Tensile Tester) at a tension speed of 50 mm/min and room temperature (25° C.), and the resultant peak was defined as a shearing adhesive strength.

<Evaluation of Wall Number and Wall Number Distribution of Carbon Nanotubes in Carbon Nanotube Aggregate>
The wall numbers and the wall number distribution of carbon nanotubes in the carbon nanotube aggregate were measured with a scanning electron microscope (SEM) and/or a transmission electron microscope (TEM). At least 10, preferably 20 or more carbon nanotubes in the obtained carbon nanotube aggregate were observed with the SEM and/or the TEM to check the wall number of each carbon nanotube, and the wall number distribution was created.
<Atomic Force Microscope Measurement, and Measurement and Evaluation of Drift Amount at the Time of the Atomic Force Microscope Measurement>
Atomic force microscope measurement was performed according to a tapping mode immediately after the fixation of a standard sample to a stage through a fixing member. The measurement was immediately performed twice, and a displaced distance between the result obtained in the first measurement and the result obtained in the second measurement was defined as a drift amount at the time of the atomic force microscope measurement.

In addition, the evaluation of the drift amount was performed by the following criteria.
⊚: The drift amount is 0.1 μm or less.
○: The drift amount is more than 0.1 μm and 0.5 μm or less.
Δ: The drift amount is more than 0.5 μm and 1.0 μm or less.
x: The drift amount is more than 1.0 μm.

It should be noted that the case where the sample peeled owing to insufficient bonding upon performance of the atomic force microscope measurement was evaluated as "peeling."

Example 1

An Al thin film (thickness: 10 nm) was formed on a silicon substrate (manufactured by KST, wafer with a thermal oxide film, thickness: 1,000 μm) with a vacuum deposition apparatus (JEE-4X Vacuum Evaporator manufactured by JEOL Ltd.). After that, the resultant was subjected to an oxidation treatment at 450° C. for 1 hour. Thus, an $Al_2O_3$ film was formed on the silicon substrate. An Fe thin film (thickness: 2 nm) was further deposited from the vapor onto the $Al_2O_3$ film with a sputtering apparatus (RFS-200 manufactured by ULVAC, Inc.) to form a catalyst layer.

Next, the resultant silicon substrate with the catalyst layer was cut and mounted in a quartz tube having a diameter of 30 mm, and a helium/hydrogen (120/80 sccm) mixed gas whose moisture content had been held at 350 ppm was flowed into the quartz tube for 30 minutes to replace the inside of the tube. After that, a temperature in the tube was increased with an electric tubular furnace to 765° C. in 35 minutes in a stepwise manner, and was stabilized at 765° C. While the temperature was held at 765° C., the inside of the tube was filled with a helium/hydrogen/ethylene (105/80/15 sccm, moisture content: 350 ppm) mixed gas, and the resultant was left to stand for 10 minutes to grow carbon nanotubes on the substrate. Thus, a carbon nanotube aggregate (1) in which the carbon nanotubes were aligned in their length directions was obtained.

The length of each of the carbon nanotubes of the carbon nanotube aggregate (1) was 200 μm.

In the wall number distribution of the carbon nanotubes of the carbon nanotube aggregate (1), the distribution width of the wall number distribution was 17 walls (4 walls to 20 walls), modes were present at 4 walls and 8 walls, and their relative frequencies were 20% and 20%, respectively.

The resultant carbon nanotube aggregate (1) was used as a sample fixing member (1) for an atomic force microscope and subjected to various evaluations. Table 1 summarizes the results.

Example 2

An Al thin film (thickness: 10 nm) was formed on a silicon wafer (manufactured by Silicon Technology Co., Ltd.) as a substrate with a sputtering apparatus (RFS-200 manufactured by ULVAC, Inc.). An Fe thin film (thickness: 1 nm) was further deposited from the vapor onto the Al thin film with the sputtering apparatus (RFS-200 manufactured by ULVAC, Inc.).

After that, the substrate was mounted in a quartz tube having a diameter of 30 mm, and a helium/hydrogen (90/50 sccm) mixed gas whose moisture content had been held at 600 ppm was flowed into the quartz tube for 30 minutes to replace the inside of the tube. After that, a temperature in the tube was increased with an electric tubular furnace to 765° C. and stabilized at 765° C. While the temperature was held at 765° C., the inside of the tube was filled with a helium/hydrogen/ethylene (85/50/5 sccm, moisture content: 600 ppm) mixed gas, and the resultant was left to stand for 10 minutes to grow carbon nanotubes on the substrate. Thus, a carbon nanotube aggregate (2) in which the carbon nanotubes were aligned in their length direction was obtained.

The length of each of the carbon nanotubes of the carbon nanotube aggregate (2) was 200 μm.

In the wall number distribution of the carbon nanotubes of the carbon nanotube aggregate (2), a mode was present at 2 walls, and its relative frequency was 75%.

The obtained carbon nanotube aggregate (2) was used as a sample fixing member (2) for an atomic force microscope and subjected to various evaluations. Table 1 summarizes the results.

Example 3

An Al thin film (thickness: 10 nm) was formed on a silicon substrate (manufactured by KST, wafer with a thermal oxide film, thickness: 1,000 μm) with a vacuum deposition apparatus (JEE-4X Vacuum Evaporator manufactured by JEOL Ltd.). After that, the resultant was subjected to an oxidation treatment at 450° C. for 1 hour. Thus, an $Al_2O_3$ film was formed on the silicon substrate. An Fe thin film (thickness: 2 nm) was further deposited from the vapor onto the $Al_2O_3$ film with a sputtering apparatus (RFS-200 manufactured by ULVAC, Inc.) to form a catalyst layer.

Next, the resultant silicon substrate with the catalyst layer was cut and mounted in a quartz tube having a diameter of 30 mm, and a helium/hydrogen (120/80 sccm) mixed gas whose moisture content had been held at 350 ppm was flowed into the quartz tube for 30 minutes to replace the inside of the tube. After that, a temperature in the tube was increased with an electric tubular furnace to 765° C. in 35 minutes in a stepwise manner, and was stabilized at 765° C. While the temperature was held at 765° C., the inside of the tube was filled with a helium/hydrogen/ethylene (105/80/15 sccm, moisture content: 350 ppm) mixed gas, and the resultant was left to stand for 15 minutes to grow carbon nanotubes on the substrate. Thus, a carbon nanotube aggregate (3) in which the carbon nanotubes were aligned in their length directions was obtained.

The length of each of the carbon nanotubes of the carbon nanotube aggregate (3) was 300 μm.

In the wall number distribution of the carbon nanotubes of the carbon nanotube aggregate (3), the distribution width of the wall number distribution was 17 walls (4 walls to 20 walls), modes were present at 4 walls and 8 walls, and their relative frequencies were 20% and 20%, respectively.

The resultant carbon nanotube aggregate (3) was used as a sample fixing member (3) for an atomic force microscope and subjected to various evaluations. Table 1 summarizes the results.

Example 4

An Al thin film (thickness: 10 nm) was formed on a silicon wafer (manufactured by Silicon Technology Co., Ltd.) as a substrate with a sputtering apparatus (RFS-200 manufactured by ULVAC, Inc.). An Fe thin film (thickness: 1 nm) was further deposited from the vapor onto the Al thin film with the sputtering apparatus (RFS-200 manufactured by ULVAC, Inc.).

After that, the substrate was mounted in a quartz tube having a diameter of 30 mm, and a helium/hydrogen (90/50 sccm) mixed gas whose moisture content had been held at 600 ppm was flowed into the quartz tube for 30 minutes to replace the inside of the tube. After that, a temperature in the tube was increased with an electric tubular furnace to 765° C. and stabilized at 765° C. While the temperature was held at 765° C., the inside of the tube was filled with a helium/hydrogen/ethylene (85/50/5 sccm, moisture content: 600 ppm) mixed gas, and the resultant was left to stand for 30 minutes to grow carbon nanotubes on the substrate. Thus, a carbon nanotube aggregate (4) in which the carbon nanotubes were aligned in their length directions was obtained.

The length of each of the carbon nanotubes of the carbon nanotube aggregate (4) was 600 μm.

In the wall number distribution of the carbon nanotubes of the carbon nanotube aggregate (4), a mode was present at 2 walls, and its relative frequency was 75%.

The resultant carbon nanotube aggregate (4) was used as a sample fixing member (4) for an atomic force microscope and subjected to various evaluations. Table 1 summarizes the results.

Example 5

An Al thin film (thickness: 10 nm) was formed on a silicon substrate (manufactured by KST, wafer with a thermal oxide film, thickness: 1,000 μm) with a vacuum deposition apparatus (JEE-4X Vacuum Evaporator manufactured by JEOL Ltd.). After that, the resultant was subjected to an oxidation treatment at 450° C. for 1 hour. Thus, an $Al_2O_3$ film was formed on the silicon substrate. An Fe thin film (thickness: 2 nm) was further deposited from the vapor onto the $Al_2O_3$ film with a sputtering apparatus (RFS-200 manufactured by ULVAC, Inc.) to form a catalyst layer.

Next, the resultant silicon substrate with the catalyst layer was cut and mounted in a quartz tube having a diameter of 30 mm, and a helium/hydrogen (120/80 sccm) mixed gas whose moisture content had been held at 350 ppm was flowed into the quartz tube for 30 minutes to replace the inside of the tube. After that, a temperature in the tube was increased with an electric tubular furnace to 765° C. in 35 minutes in a stepwise manner, and was stabilized at 765° C. While the temperature was held at 765° C., the inside of the tube was filled with a helium/hydrogen/ethylene (105/80/15 sccm, moisture content: 350 ppm) mixed gas, and the resultant was left to stand for 30 minutes to grow carbon nanotubes on the substrate.

Thus, a carbon nanotube aggregate (5) in which the carbon nanotubes were aligned in their length directions was obtained.

The length of each of the carbon nanotubes of the carbon nanotube aggregate (5) was 600 μm.

In the wall number distribution of the carbon nanotubes of the carbon nanotube aggregate (5), the distribution width of the wall number distribution was 17 walls (4 walls to 20 walls), modes were present at 4 walls and 8 walls, and their relative frequencies were 20% and 20%, respectively.

The resultant carbon nanotube aggregate (5) was used as a sample fixing member (5) for an atomic force microscope and subjected to various evaluations. Table 1 summarizes the results.

Comparative Example 1

An Al thin film (thickness: 10 nm) was formed on a silicon substrate (manufactured by KST, wafer with a thermal oxide film, thickness: 1,000 μm) with a vacuum deposition apparatus (JEE-4X Vacuum Evaporator manufactured by JEOL Ltd.). After that, the resultant was subjected to an oxidation treatment at 450° C. for 1 hour. Thus, an $Al_2O_3$ film was formed on the silicon substrate. An Fe thin film (thickness: 2 nm) was further deposited from the vapor onto the $Al_2O_3$ film with a sputtering apparatus (RFS-200 manufactured by ULVAC, Inc.) to form a catalyst layer.

Next, the resultant silicon substrate with the catalyst layer was cut and mounted in a quartz tube having a diameter of 30 mm, and a helium/hydrogen (120/80 sccm) mixed gas whose moisture content had been held at 350 ppm was flowed into the quartz tube for 30 minutes to replace the inside of the tube. After that, a temperature in the tube was increased with an electric tubular furnace to 765° C. in 35 minutes in a stepwise manner, and was stabilized at 765° C. While the temperature was held at 765° C., the inside of the tube was filled with a helium/hydrogen/ethylene (105/80/15 sccm, moisture content: 350 ppm) mixed gas, and the resultant was left to stand for 5 minutes to grow carbon nanotubes on the substrate. Thus, a carbon nanotube aggregate (C1) in which the carbon nanotubes were aligned in their length directions was obtained.

The length of each of the carbon nanotubes of the carbon nanotube aggregate (C1) was 90 μm.

In the wall number distribution of the carbon nanotubes of the carbon nanotube aggregate (C1), the distribution width of the wall number distribution was 17 walls (4 walls to 20 walls), modes were present at 4 walls and 8 walls, and their relative frequencies were 20% and 20%, respectively.

The resultant carbon nanotube aggregate (C1) was used as a sample fixing member (C1) for an atomic force microscope and subjected to various evaluations. Table 1 summarizes the results.

Comparative Example 2

An Al thin film (thickness: 10 nm) was formed on a silicon wafer (manufactured by Silicon Technology Co., Ltd.) as a substrate with a sputtering apparatus (RFS-200 manufactured by ULVAC, Inc.). An Fe thin film (thickness: 1 nm) was further deposited from the vapor onto the Al thin film with the sputtering apparatus (RFS-200 manufactured by ULVAC, Inc.).

After that, the substrate was mounted in a quartz tube having a diameter of 30 mm, and a helium/hydrogen (90/50 sccm) mixed gas whose moisture content had been held at 600 ppm was flowed into the quartz tube for 30 minutes to replace the inside of the tube. After that, a temperature in the tube was increased with an electric tubular furnace to 765° C. and stabilized at 765° C. While the temperature was held at 765° C., the inside of the tube was filled with a helium/hydrogen/ethylene (85/50/5 sccm, moisture content: 600 ppm) mixed gas, and the resultant was left to stand for 6 minutes to grow carbon nanotubes on the substrate. Thus, a carbon nanotube aggregate (C2) in which the carbon nanotubes were aligned in their length direction was obtained.

The length of each of the carbon nanotubes of the carbon nanotube aggregate (C2) was 120 μm.

In the wall number distribution of the carbon nanotubes of carbon nanotube aggregate (C2), a mode was present at 2 walls, and its relative frequency was 75%.

The obtained carbon nanotube aggregate (C2) was used as a sample fixing member (C2) for an atomic force microscope and subjected to various evaluations. Table 1 summarizes the results.

Comparative Example 3

A conductive carbon double-sided tape (731: manufactured by Nisshin EM Corporation) was used as a sample fixing member for an atomic force microscope and subjected to various evaluations. Table 1 summarizes the results.

TABLE 1

|  | Thickness (length) of fixing member (μm) | Shearing adhesive strength (N/cm²) | Drift amount at the time of atomic force microscope measurement (μm) | Evaluation of drift amount |
|---|---|---|---|---|
| Example 1 | 200 | 10.9 | 0.62 | Δ |
| Example 2 | 200 | 11.3 | 0.56 | Δ |
| Example 3 | 300 | 17.2 | 0.33 | ○ |
| Example 4 | 600 | 30.8 | 0.08 | ◎ |
| Example 5 | 600 | 44.5 | 0.07 | ◎ |
| Comparative Example 1 | 90 | 5.9 | Peeling | — |
| Comparative Example 2 | 120 | 4.1 | Peeling | — |
| Comparative Example 3 | 90 | 140 | 2.72 | X |

INDUSTRIAL APPLICABILITY

The sample fixing member for an atomic force microscope of the present invention can be suitably used as a member for fixing a sample to be measured in an atomic force microscope.

REFERENCE SIGNS LIST

10 fibrous columnar structure
1 base material
2 fibrous columnar object
2a one end of fibrous columnar object

The invention claimed is:
1. A sample fixing member for an atomic force microscope, comprising a base material and a fibrous columnar structure including a plurality of fibrous columnar objects each having a length of 200 μm or more,
   wherein the fibrous columnar structure comprises a carbon nanotube aggregate including a plurality of carbon nanotubes,
   wherein the carbon nanotubes each have a plurality of walls, wherein each of the fibrous columnar objects is aligned in a horizontal direction with respect to each adjacent fibrous columnar object, and wherein the fibrous columnar objects are aligned in a direction substantially perpendicular to the base material.

2. A sample fixing member for an atomic force microscope according to claim 1, wherein the sample fixing member has a shearing adhesive strength for a glass surface at room temperature of 10 N/cm² or more.

3. A sample fixing member for an atomic force microscope according to claim 1, wherein:

a distribution width of a wall number distribution of the carbon nanotubes is 10 walls or more; and a relative frequency of a mode of the wall number distribution is 25% or less.

4. A sample fixing member for an atomic force microscope according to claim 1, wherein:

a mode of a wall number distribution of the carbon nanotubes is present at a wall number of 10 or less; and a relative frequency of the mode is 30% or more.

5. A sample fixing member for an atomic force microscope according to claim 1, wherein the sample fixing member comprises a base material.

\* \* \* \* \*